United States Patent [19]

Lilly

[11] Patent Number: 5,712,324

[45] Date of Patent: Jan. 27, 1998

[54] U-V CURABLE WEATHER RESISTANT COATINGS MADE BY A COLD-CAST PROCESS

[75] Inventor: Kenneth L. Lilly, Evansville, Ind.

[73] Assignee: General Electric Company, Pittsfield, Mass.

[21] Appl. No.: 753,168

[22] Filed: Nov. 21, 1996

Related U.S. Application Data

[63] Continuation of Ser. No. 416,424, Apr. 4, 1995, abandoned.

[51] Int. Cl.[6] .................................... C09D 4/00; C08F 2/50
[52] U.S. Cl. .............................. 522/75; 522/96; 522/167; 522/64
[58] Field of Search ............................... 522/75, 96, 182, 522/64, 167

[56] References Cited

U.S. PATENT DOCUMENTS

| 4,528,311 | 7/1985 | Beard et al. | 524/91 |
| 5,227,240 | 7/1993 | Tilley | 428/412 |

FOREIGN PATENT DOCUMENTS

| 0331087 | 6/1989 | European Pat. Off. . |
| A-386298 | 9/1990 | European Pat. Off. . |
| A-445570 | 9/1991 | European Pat. Off. . |
| WO-A-9400524 | 1/1994 | WIPO . |

*Primary Examiner*—Susan W. Berman

[57] ABSTRACT

A radiation curable, organic coating for improving the weatherability of a thermoplastic resin substrate employs as a polymerizable, cross-linking monomer component, a 2-hydroxy-5-acrylyloxyphenyl-2H-benzotriazole.

7 Claims, No Drawings

U-V CURABLE WEATHER RESISTANT COATINGS MADE BY A COLD-CAST PROCESS

This is a continuation of application Ser. No. 08/416,424 filed on Apr. 4, 1995, now abandoned.

BACKGROUND OF THE INVENTION

1. Field of the Invention

The invention relates to ultra-violet light absorbing, photo-curable polymeric coatings useful to improve weather resistance in synthetic polymeric resin substrates.

2. Brief Description of Related Art

Coating polymeric resin substrates such as, for example, articles of molded polycarbonate, polyester, polyurethane and the like to improve their resistance to weathering is an accepted procedure. Advantageously, the coatings are comprised of radiation curable polyacrylic or polyacrylic-urethane coatings; see for example the coating descriptions set forth in the U.S. Pat. Nos. 4,198,465; 4,455,205; 4,477,529; 4,478,876; and 4,486,504.

In general, the radiation-curable coatings comprise a radiation-curable (cross-linking-polymerizable), polyfunctional acrylate, a photoinitiator compound and an ultra-violet light absorbing compound. The coating, in a fluid form, is applied to the polymeric resin substrate. The coating may be cured in-situ by a technique called "cold coating" by directing radiant energy through the substrate opposite the surface being coated; see for example the description in U.S. Pat. No. 5,227,240 (Tilley et al.) issued Jul. 13, 1993 and incorporated herein by reference thereto.

In the known radiation-curable coating compositions, a wide variety of compounds have been employed as the ultra-light absorbing ingredient, which is necessary to protect the substrate resin from degradation during curing and thereby enhance optimum weathering characteristics. For example, European Patent Application No. 0,331,087 A2 describes these compounds as derivatives of benzophenone, benzotriazole, phenyl salicylate and phenyl benzoate and having a maximum absorption wavelength in the range of 240–370 nm. Specific compounds are named. Some acrylate monomers, precursors to polymerizations, are also known to be effective ultra-violet light absorbers. The U.S. Pat. No. 5,227,240 specifies 2-hydroxybenzophenones, 2-hydroxybenzotriazoles and phenyl cyanoacrylates as ultra-violet light absorbing monomer compounds which can be polymerized.

The U.S. Pat. No. 4,528,311 (Beard et al.) issued Jul. 9, 1985 describes a class of 2-hydroxy-5-acrylyloxyphenyl-2H-benzotriazole monomers, which are copolymerizable with vinyl monomers to obtain thermoplastic resins moldable to obtain articles such as lenses with ultra-light absorbing properties.

SUMMARY OF THE INVENTION

The invention comprises, a radiation curable, organic coating composition, which comprises;

A. 100 parts by weight of a photopolymerizable composition, which comprises;

(i) a cross-linking, polymerizable compound containing at least 2 acryloyloxy or methacryloyloxy groups per molecule; and a proportion of (ii) a compound of the formula:

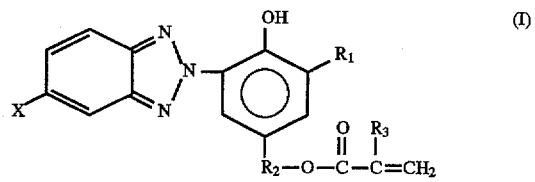

wherein X represents hydrogen or halogen; $R_1$ is selected from the group consisting of hydrogen, and alkyl of 1 to 6 carbon atoms; $R_2$ represents alkylene of 2 to 10 carbon atoms; and $R_3$ represents hydrogen or methyl;

B. 0.01 to 10 parts by weight of a photoinitiator; and

C. 0.1 to 15 parts by weight of an ultra-violet light absorbing compound.

The invention also comprises the radiation-cured coating compositions and articles coated with the cured coating compositions.

The term "halogen" is used herein in its commonly accepted sense as embracive of chlorine, bromine and iodine.

The cured coating compositions of the invention exhibit improved resistance to weathering and are useful to enhance the weatherability of articles subject to weathering. Representative of advantageous coated articles of the invention are laminate housings for articles such as gasoline delivery pumps, marine articles, outdoor equipment, signage and the like.

The term "coating" is used herein in its commonly accepted sense as meaning a film spread over a surface. The coating compositions of the invention form cured coatings, preferably of little depth. Preferred cured coatings formed from the compositions of the invention have a depth within the range of from about 1.0 to about 6.0 mils.

DETAILED DESCRIPTION OF THE PREFERRED EMBODIMENTS OF THE INVENTION

Cross-linkable, polymerizable compounds (A.i) containing at least 2 acryloloxy or methacryloloxy groups per molecule are a well known class of compounds, as are methods of their preparation. In general, they may be prepared by the reaction of a polyhydric alcohol or a derivative thereof with acrylic acid, methacrylic acid or esters thereof. Representative of the cross-linkable, polymerizable compounds (Ai) described above are diethylene glycol di(meth) acrylates, triethylene glycol di(meth) acrylates, tetraethylene glycol (meth) acrylates, 1,4-butanediol di(meth)-acrylates and 1,6-hexanediol di(meth) acrylates. Illustrative examples of poly(meth)acrylates containing three or more (meth)acryloyloxy groups include trimethylolpropane tri(meth)acrylates; trimethyloylethane tri(meth)acrylates; pentaglycerol tri(meth)acrylates; pentaerythritol tri(meth)acrylates; pentaerythritol tetra(meth) acrylates; glycerin tri(meth)acrylates; and compounds represented by the general formula:

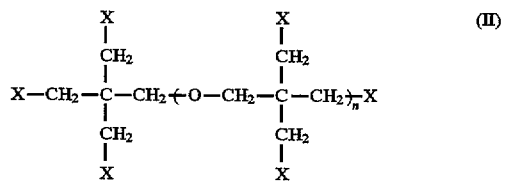

wherein n is an integer of 1–4, at least three of the Xs are independently a

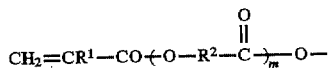

group, m stands for an integer of 0–2, $R^1$ represents a hydrogen atom or methyl group and $R^2$ denotes an alkylene group having 1–6 carbon atoms, and any remaining X is an OH group; for example dipentaerythritol tri(meth)acrylates, dipentaerythritol tetra(meth)acrylates, dipentaerythritol penta(meth)acrylates, dipentaerythritol hexa(meth) acrylates, tripentaerythritol tetra(meth)acrylates, tripentaerythritol penta(meth)acrylates, tripentaerythritol hexa (meth)acrylates and tripentaerythritol hepta(meth)acrylates.

Also within the scope of the compounds (Ai) are poly (meth)acrylates of saturated or unsaturated polyester obtained by reaction of a polyhydric alcohol or a derivative thereof and a polycarboxylic acid or a derivative thereof, with (meth)acrylic acid or a derivative thereof. Representative of the latter polyester poly(meth)acrylates are compounds obtained by reacting a mixture of a polyhydric alcohol, a polycarboxylic acid and a (meth)acrylic acid at a ratio such that the hydroxyl groups of the polyhydric alcohol eventually become equivalent in amount to the carboxyl groups of both the polycarboxylic acid and (meth)acrylic acid.

As preferable polyester poly(meth)acrylates, may be mentioned those obtained individually by using a dihydric alcohol or a mixture of a dihydric alcohol and a trihydric alcohol as a polyhydric alcohol and a dicarboxylic acid as a polycarboxylic acid. When a mixture of a trihydric alcohol and a dihydric alcohol is used, any molar ratio of the trihydric alcohol to the dihydric alcohol can be chosen. The molar ratio of the dicarboxylic acid to (meth)acrylate acid is preferably determined in such a way that the equivalent ratio of the carboxyl groups of the dicarboxylic acid to the carboxyl groups of the (meth)acrylic acid falls within a range of from 2:1 to 0:1. If the proportion of the dicarboxylic acid is greater than the upper limit of the above range, the viscosity of the resulting polyester poly(meth)acrylate will be so high that difficulties will be encountered upon formation of the coating.

Preferred compounds (Ai) are urethane poly(meth) acrylates obtained from reaction of a polyisocyanate and a compound containing at least one active hydrogen atom and at least one (meth)acryloyloxy group. These compounds are obtained by reacting an aromatic or aliphatic polyisocyanate with at least 2 moles, per mole of the isocyanate compound, of a compound containing at least one active hydrogen atom and at least one (meth)acryloyloxy group [for example, 2-hydroxy-ethyl (meth)acrylate, 2-hydroxypropyl (meth) acrylate, 2-hydroxy-3-propyl (meth)acrylate, or N-methylol (meth)acrylamide] or, for example, the tri(meth)acrylates or di(meth)acrylates of tris(2-hydroxyethyl)isocyanuric acid and the tri(meth)acrylates or di(meth)acrylates of di(2-hydroxyethyl)mono(2-hydroxyheptane)isocyanuric acid; and (ii) compounds represented by the general formula:

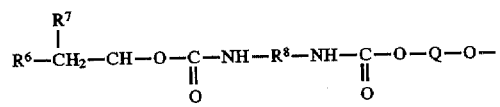

(III)

-continued

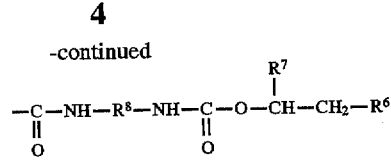

wherein $R^6$ represents a (meth)acryloyloxy group, $R^7$ denotes a hydrogen atom or methyl group, $R^8$ is a phenylene group, a substituted phenylene group or an alkylene group having 2–6 carbon atoms, and Q is

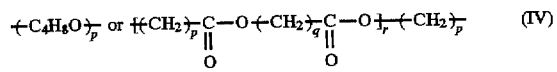

(IV)

in which p, q and r are individually an integer of 1–8 and y is an integer of 0–10.

Preferred urethane poly(meth)acrylates are diacrylated aliphatic urethanes having a theoretical weight average molecular weight of about 1000 to 2000, i.e., oligomers.

The above-described crosslinking-polymerizable compounds (A.i) may be used singly. It is however preferred to use two or more of the compounds (A.i) in combination. Among the crosslinking-polymerizable compounds (A.i), those containing three or more (meth)acryloyloxy groups are useful as components capable of imparting high abrasion resistance and chemical resistance to a cured coating. It is thus preferred that a compound containing three or more (meth)acryloyloxy groups make up a portion of the crosslinking-polymerizable compound (A.i). Among the crosslinking-polymerizable compounds (A.i), a compound containing two (meth)acryloyloxy groups is useful as a component capable of imparting sufficient adhesion and flexibility to the cured coating and preferably, also makes up a portion of the crosslinking-polymerizable compound (a-1). In particular a compound containing two or three (meth) acryloyloxy groups and having a viscosity not higher than 150 cps at 20° C. is effective in providing an ultra-violet curing coating composition and forming a preferred cured coating.

It is advantageous that the crosslinking-polymerizable compound (A.i) be a mixture of 0–75 wt. % of a compound (A.i) containing at least three (meth)acryloyloxy groups and having a viscosity higher than 150 cps at 20° C. and 25–100 wt. % of another compound containing two (meth) acryloyloxy groups and having a viscosity not higher than 150 cps at 20° C. Most preferred, the compound containing two (meth)acryloyloxy groups be a mixture of compounds, including one of which is a diacrylated urethane oligomer as described above.

The compounds (A.ii) of formula (I) given above are also well known compounds as are methods of their preparation; see for example U.S. Pat. No. 4,528,311 incorporated herein by reference thereto.

The coating compositions of the invention contain from 0.01 to 15 percent by weight of the monomer compounds of formula (I) based on the weight of the polymerizable compounds (A.).

Illustrative examples of the photoinitiator compound (B.) include carbonyl compounds such as benzoin, benzoin methyl ether, benzoin ethyl ether, benzoin propyl ether, benzoin isobutyl ether, acetoin, butyroin, toluoin, benzil, benzophenone, p-methoxybenzophenone, 2,2-diethoxyacetophenone, α-α-dimethoxy α-phenylacetophenone, methylphenyl glyoxylate, ethyphenyl glyoxylate, 4,4'-bis-(dimethylaminobenzophenone), and 2-hydroxy-2-methyl-1-phenyl-propan-1-one; sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert-butyl peroxide.

As illustrative examples of preferred photoinitiator compounds (B.) having a peak of sensitive wavelengths between 365-400 nm may be mentioned thioxanthone photoinitiators and acylophosphine oxide photoinitiators. Specific examples of thioxanthone photoinitiators include 7-chlorothioxanthone, 2,4-diethylthioxanthone and 2,4-diisopropylthioxanthone. Since use of these thioxanthone photoinitiators may result in a hardened coating tinged in yellow, acylophosphine oxide photoinitiators are preferable. Among acylophosphine oxide photoinitiators, preferred are those represented by the general formula:

(V)

wherein $R_3$, $R^4$ and $R^5$ each independently represent an alkyl or oxyalkyl group having 1-8 carbon atoms or a phenyl substituted phenyl, benzyl or substituted benzyl group. Preferred are those represented by the formula (V) in which $R^3$, $R^4$ and $R^5$ are each independently an oxyalkyl group having 1-8 carbon atoms, a phenyl group or a substituted phenyl group. Specific examples of particularly preferred phosphine oxide photoinitiators include diphenyl(2,4,6-trimethylbenzoyl) phosphine oxide and benzoylidiethoxyphosphine oxide.

In the present invention, the photoinitiator (B.) is used in an amount of 0.01-10 parts by weight per 100 parts by weight of the photopolymerizable compounds (A.). The photoinitiator (B.) compound is used preferably in an amount of 0.1-7 parts by weight.

No particular limitation is imposed on the ultraviolet absorber compound (C.) to be used in this invention. Any ultraviolet absorber can be used as long as it can be dissolved in the photopolymerizable composition. Preferred are compounds derived from benzophenone, benzotriazole, phenyl salicylate and phenyl benzoate and having a maximum absorption wavelength in a range of 240-370 nm from the standpoint of good solubility in the coating of this invention and the weatherability of the composition to be obtained. These ultraviolet absorbers may be used either singly or in combination.

Specific examples of ultraviolet absorbers (C.) include 2-hydroxybenzophenone, 5-chloro-2-hydroxybenzophenone, 2,4-dihydroxybenzophenone, 2-hydroxy-4-methoxybenzophenone, 2-hydroxy-4-n-octoxybenzophenone, 4-dodecyloxy-2-hydroxybenzophenone, 2-hydroxy-4-octadecyloxybenzophenone, 2,2'-dihydroxymethoxybenzophenone, 2,2'-dihydroxy-4-4-dimethoxybenzophenone, phenyl salicylate, p-tert-butylphenyl sacicylate, p (1,1,3,3 tetramethylbutyl)phenyl salicylate, 3-hydroxyphenyl benzoate, phenylene-1,3-dibenzoate, 2-(2-hydroxy-5-methylphenyl)benzotriazole, 2-(2-hydroxy-5-tertbutylphenyl)-5-chlorobenzotriazole, 2-(2-hydroxy-3,5-di-tert-butylphenyl)benzotriazole, 2-(2-hydroxy-5-tert-butylphenyl)benzotriazole, 2-(2-hydroxy-4-octyloxyphenyl)benzotriazole and the like.

The ultraviolet absorbers are added in an amount sufficient to protect a molded polymeric resin substrate article from harmful light and hence to impart good weatherability. The amount of ultraviolet absorber to be added depends primarily on the thickness of the coating to be formed. In general, the ultraviolet absorber (C.) is added in an amount of 0.1-15 parts by weight per 100 parts by weight of the photopolymerizable compounds (A.).

The preferable amount of the ultraviolet absorber (C) to be added may range from 0.001 mole to 0.045 mole per 100 g of the photopolymerizable compounds (A.).

Although the photopolymerizable composition (A), photoinitiator (B) and ultraviolet absorber (C) are essential components for the coating composition according to this invention, to the coating composition of this invention may be added small amounts of fine particles of an inorganic pigment such as silica, titanium oxide, or aluminum oxide; fine organic particles of a crosslinked polymer or copolymer formed by emulsion or suspension polymerization; a stabilizer such as an antioxidant or polymerization inhibitor; a leveling agent; a defoaming agent; a thickener; an anti-setting agent; a pigment dispersant; an antistatic agent; an anti-fogging agent; a delustering agent or lustering agent; and other agents as needed and used in conventional proportions. In general, conventional proportions are within the range of from about 0.5 to 10 percent by weight of the total composition.

As a diluent for facilitating the coating application or bringing about the leveling effect upon coating a base material by spraying, brushing or dipping or by means of a roll coater, an organic solvent may be used as needed. Organic solvents usable for this purpose are preferably those miscible with the ultraviolet-curing coating composition and having a boiling point of at least 50° C. but not higher than 200° C. at atmospheric pressure and a viscosity not higher than 10 cps at room temperature. Specifically, it is possible to use alcohols such as methanol, ethanol, isopropanol, n-propanol, isobutanol and n-butanol; aromatic hydrocarbons such as benzene, toluene, xylene and ethylbenzene; ketones such as acetone and methylethyl ketone; and dioxane, ethyl acetate, n-butyl acetate, ethyl cellosolve and propionic acid.

Preferably however, the coating compositions of the invention are solvent-free except for reactive ingredients which function also as solvents.

The process of this invention, which is suitable for use in the production of a molded synthetic polymer article having a cured coating can be practiced by coating the substrate with a fluid form of the coating compositions of the invention and exposing the composition to ultraviolet rays to cure the coating, thereby forming the cured coating on the article. The thickness of the cured coating may be as little as 1-300 µm with 10 µm-20 µm being a preferred thickness.

As a method for coating the molded plastic article, any method may be used as long as the coating composition can be brought into close contact with the article by means of press rolls, a squeezing bar, a brush, a squeegee, spray or the like to give a uniform thickness to the resulting coating. Lithographic, screen, gravure, direct or reverse roll, and curtain coating techniques may be employed.

As the radiation source for ultraviolet rays, may be mentioned a fluorescent chemical lamp, high-pressure mercury-vapor lamp, ultra-high-pressure mercury-vapor lamp, arc lamp or the like.

As the synthetic resin substrate polymer making up the molded article to be coated in accordance with the present invention, a thermoplastic resin is preferred. Illustrative examples of thermoplastic resins include polymethacrylic resin, polycarbonate resins, polymethacrylimide resin, styrene-based resins, ABS resin, MS resin and vinyl chloride resin. Among these, polymethacrylic resin, polycarbonate resins and polymethacrylimide resin are preferred as base polymers making up molded plastic articles to be coated in accordance with this invention, since they are employed widely by making use of their characteristic properties such as high heat resistance and impact resistance, but may require improvement in weatherability or abrasion resistance.

The following examples and preparations describe the manner and process of making and using the invention and set forth the best mode contemplated by the inventor of carrying out the invention but are not to be construed as limiting the invention. Where reported, the following tests were carried out.

Weatherability test:

Using a Q.U.V. accelerated weathering tester manufactured by Q-Panel Company, each sample was exposed to ultraviolet rays from a 313B lamp for 700 to 1155 hours in total through cycles consisting of exposure at 60° C. under dry conditions for 8 hours and subsequent placing in a dark place under wet conditions at 60° C. for 4 hours. The Q.U.V. accelerated weathering test followed the "light and water exposure test for non-metallic materials" prescribed in ASTM G53-84.

Yellow Index (YI)

Measured on a Gardner Colorimeter model XL-835 after the accelerated aging test, prescribed in Test method ASTM D1925.

Preparation 1

An ultraviolet light curing coating composition was prepared in accordance with the following formulation:

|   |   | Wt % |
|---|---|---|
| 1. | trimethylolpropane triacrylate (TMPTA-Sartomer 351; Sartomer Company) | 13.9 |
| 2. | hexanediol diacrylate (HDODA-Sartomer 238; Sartomer Company) | 36.8 |
| 3. | acrylated aliphatic urethane oligomer/monomer blend (Ebecryl ® 284); UCB Radcure, Inc., Smyrno, GA.; see bulletin of 8/93. | 39.8 |
| 4. | 2(2 hydroxy-3,5-ditert amylphenyl) benzotriazole (Tinuvin ® 328; Ciba-Geigy Corp., Hawthorne, N.Y.) | 3.5 |
| 5. | 2(2 hydroxy-5-tert octylphenyl) benzotriazole (Cyasorb ® 5411; American Cyanamid Company). | 3.5 |
| 6. | diphenyl (2,4,6-trimethyl benzoyl) Phosphine Oxide (Lucirin ® TPO; BASF). | 1.5 |
| 7. | bis 2,2,6,6 tetramethyl 4 piperindyl Ester (Tinuvin ® 123; Ciba-Geigy Corp., Hawthorne, N.Y.) | 1.0 |

The radiation curable coating composition is applied onto a 15 mil Lexan® polycarbonate film (General Electric Company) in accordance with the cold cast procedures mentioned in U.S. Pat. Nos. 5,162,390 and 5,227,240, followed by expulsion of air from the coating by adjusting the pressure of the nip resulting from contact between the coated film and the smooth drum surface. Cure was effected using two Linde medium pressure mercury lamps operating at a total does of 6.2 Joules/cm2. The line speed was 20 feet per minute. The surface temperature is about 105° F. after curing. This technique creates a solid composite of polycarbonate and coating. The coating and curing technique was repeated three times to produce the thick coatings (0.6 to 0.7 mils). Thin coatings (0.3 to 0.4 mils) required a single pass. The test results are shown below in Table 1.

EXAMPLES 1-2

A formulation as prepared in Preparation 1, supra., was prepared, except that portions of the acrylate co-reactant monomers (items 1-3) were replaced with 1.0, 3.0 or 4.0% by weight of 2(2 hydroxy-5-methacrylyloxyethylphenyl) 2H benzotriazole (Norbloc® 7966); Norma Company, having the formula:

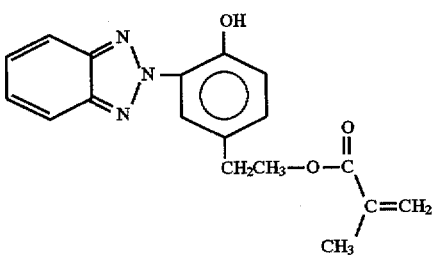

The test results, proportion of Norbloc® 7966 and thickness of the coatings are shown in the Table 1, below. Thin coatings are preferred in industry, because of the potential for reduced costs. For this reason, thick coatings (more than about 0.35 mils) containing Norbloc® 7966, were not evaluated for weathering resistance.

TABLE 1

|   | Weight Percentage Norbloc ® 7966 | Coating Thickness (mils) | Weather Ability (Hours) | YI |
|---|---|---|---|---|
| Preparation 1 | 0 | 0.35 | 700 | 3.8 |
|   | 0 | 0.65 | 700 | 2.0 |
| Example 1 | 1.0 | 0.35 | 1155 | 2.3 |
| Example 2 | 4.0 | 0.35 | 1155 | 1.5 |

EXAMPLES 3-4 (COMPARATIVE EXAMPLES)

A commonly used U-V absorber is Tinuvin® 328, 2-(2 hydroxy-3,5-ditert amylphenyl) benzotriazole. A formulation as prepared and tested in Preparation 1, supra., was prepared except that portions of the Tinuvin® 328 as used therein were increased to 4.5, and 5.5 wt. % (Examples 1 and 2). The proportions and test results are shown in Table 2 below.

TABLE 2

|   | Weight % Tinuvin ® | Ct. Thickness (mils) | Weather Ability (Hours) | YI |
|---|---|---|---|---|
| Preparation 1 | 3.5 | 0.35 | 700 | 3.8 |
|   |   | 0.65 | 700 | 2.0 |
| Example 3 | 4.5 | 0.35 | 700 | 4.5 |
| Example 4 | 5.5 | 0.35 | 700 | 4.8 |

What is claimed:

1. A radiation curable, organic coating composition, which comprises;

A. 100 parts by weight of a photopolymerizable composition, which comprises;
(i) a cross-linking, polymerizable mixture of trimethylolpropane triacrylate, hexanediol diacrylate and a diacrylate urethane oligomer; and a proportion of (ii) a compound of the formula:

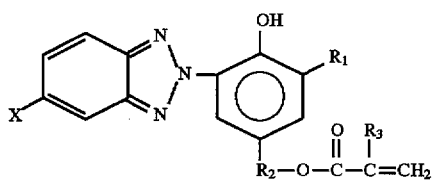

wherein X represents hydrogen or halogen; R1 is selected from the group consisting of hydrogen, and alkyl of 1 to 6 carbon atoms; R2 represents alkylene of 2 to 10 carbon atoms; and R3 represents hydrogen or methyl;

B. 0.01 to 10 parts by weight of a photo-initiator; and

C. 0.1 to 15 parts by weight of an ultra-violet light absorbing compound.

2. The composition of claim 1 wherein the proportion of the compound (A) (ii) is within the range of from about 0.01 to 15 percent by weight of the photopolymerizable (A).

3. The composition of claim 2 wherein the compound of formula (I) is 2(2 hydroxy-5-methacrylyloxyethylphenyl) 2H-benzotriazole.

4. A cured composition of claim 1.

5. A thermoplastic resin substrate coated with the composition of claim 4.

6. A radiation curable, organic coating composition, which comprises:

A. 100 parts by weight of a photopolymerizable composition, which comprises;
   from 5 to 15 percent by weight of trimethylolpropane triacrylate;
   from 20 to 40 percent by weight of hexanediol diacrylate;
   from 20 to 40 percent by weight of an acrylated urethane oligomer;
   from 1 to 5 percent by weight of 2(2-hydroxy-5 methacrylyloxyethylphenyl) 2H-benzotriazole;

B. 0.01 to 10 parts by weight of a photoinitiator; and

C. 0.01 to 15 parts by weight of an ultraviolet light absorbing compound.

7. A cured composition of claim 6.

* * * * *